(12) United States Patent
Qu

(10) Patent No.: US 9,442,343 B2
(45) Date of Patent: Sep. 13, 2016

(54) ELECTRONIC PAPER DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Lianjie Qu, Beijing (CN)

(73) Assignees: BOE TECHNOLOGY GROUP CO., LTD., Beijing (CN); BEIJING BOE OPTOELECTRONICS TECHNOLOGY GO., LTD., Beijing (CN)

( * ) Notice: Subject to any disclaimer, the term of this patent is extended or adjusted under 35 U.S.C. 154(b) by 140 days.

(21) Appl. No.: 14/491,401

(22) Filed: Sep. 19, 2014

(65) Prior Publication Data

US 2015/0277204 A1    Oct. 1, 2015

(30) Foreign Application Priority Data

Mar. 31, 2014  (CN) .......................... 2014 1 0126643

(51) Int. Cl.
*G02B 26/00* (2006.01)
*G09G 3/34* (2006.01)
(Continued)

(52) U.S. Cl.
CPC ................ *G02F 1/167* (2013.01); *B82Y 20/00* (2013.01); *G02B 5/0242* (2013.01); *G02B 26/026* (2013.01); *G02F 1/01* (2013.01); *G02F 1/133348* (2013.01); *G02F 1/134336* (2013.01); *G02F 1/172* (2013.01); *G02F 2001/1676* (2013.01); *G02F 2001/1678* (2013.01);
(Continued)

(58) Field of Classification Search
CPC ........... G02F 1/167; G02F 2001/1678; G02F 2001/1676; G02F 1/133348; G02F 1/172; G02F 1/01; G02F 1/134336; G02F 2201/123; Y10S 977/774; Y10S 977/773; Y10S 977/932; Y10S 977/779; G02B 5/0242; G02B 26/026
USPC ......... 359/296; 345/107; 977/707, 720, 773, 977/774, 778, 779, 932
See application file for complete search history.

(56) References Cited

U.S. PATENT DOCUMENTS 7,502,162 B2 *  3/2009  Lin ........................ G02F 1/167
                                                         359/296
2011/0227080 A1    9/2011  Roh et al.

FOREIGN PATENT DOCUMENTS

| CN | 102375608 A | 3/2012 |
| CN | 103412435 A | 11/2013 |
| CN | 203502713 U | 3/2014 |

OTHER PUBLICATIONS

Hutchins et al, "Optical Properties of Fluorescent Mixtures: Comparing Quantum Dots to Organic Dyes," Journal of Chemical Education, vol. 84 No. 8, Aug. 2007, pp. 1301-1303.*

(Continued)

*Primary Examiner* — Evelyn A Lester
(74) *Attorney, Agent, or Firm* — Harness, Dickey & Pierce, P.L.C.

(57) ABSTRACT

An electronic paper display device according to the disclosure may include an upper substrate provided with a first electrode layer, a lower substrate provided with a second electrode layer, and an electronic ink layer disposed between the first electrode layer and the second electrode layer. Microcapsules are distributed in the electronic ink layer, and at least one kind of quantum dots which are used to display one color are encapsulated within the microcapsules.

14 Claims, 3 Drawing Sheets

(51) Int. Cl.
*G02F 1/167* (2006.01)
*B82Y 20/00* (2011.01)
*G02F 1/01* (2006.01)
*G02F 1/1343* (2006.01)
*G02B 5/02* (2006.01)
*G02B 26/02* (2006.01)
*G02F 1/1333* (2006.01)
*G02F 1/17* (2006.01)

(52) U.S. Cl.
CPC ...... *G02F2201/123* (2013.01); *Y10S 977/773* (2013.01); *Y10S 977/774* (2013.01); *Y10S 977/779* (2013.01); *Y10S 977/932* (2013.01); *Y10S 977/952* (2013.01)

(56) References Cited

OTHER PUBLICATIONS

Zhao et al, "Low-Dimensional Nanomaterials Based on Small Organic Molecules: Preparation and Optoelectronic Properties," Advanced Materials (2008), pp. 1-19.*
Bera et al, "Quantum Dots and Their Multimodal Applications: A Review," Materials (2010), pp. 2260-2345.*
First Office Action regarding Chinese application No. 201410126643.0, dated Mar. 3, 2016. Translation provided by Dragon Intellectual Property Law Firm.

* cited by examiner

-PRIOR ART-

-PRIOR ART-

ELECTRONIC PAPER DISPLAY DEVICE

CROSS-REFERENCE TO RELATED APPLICATIONS

This application claims the priority to Chinese Patent Application No. 201410126643.0 filed with the Chinese Patent Office on Mar. 31, 2014, which is incorporated herein by reference in its entirety.

TECHNICAL FIELD

The present disclosure relates to a display device, and particularly to an electronic paper display device capable of displaying multiple colors.

BACKGROUND

The conventional liquid crystal display (LCD) device is unable to have a very thin thickness (e.g., if each of two glass layers of the LCD has a thickness of 0.7 mm and two substrates thereof has a total thickness of 0.5 mm, then the thickness of the display screen of the LCD may be not smaller than 2 mm) and a very light weight due to the limitation on its structure. In contrast, the electronic ink display device has a very simple hardware structure and may have a thickness down to 1 mm. Furthermore, the electronic ink display device has a display screen thickness smaller than a half of the LCD and has a quite light weight, but has durability stronger than the common LCDs. The electronic ink has a wide range of applications, and especially the electronic ink may not only be applied to a glass surface but also be applied to a plastic surface, and thus an electronic ink display screen will not be as fragile as the LCD display screen. Meanwhile, the electronic ink display screen has very low power consumption, and may display a picture even in the case of a transient power lost. Its very low power consumption lies in that it has a very high reflectivity and contrast and thus there is no need to adopt a backlight to improve its readability.

Since a display device to which the electronic ink technology is applied has a same visual characteristic as a paper medium, and has the advantages of low power consumption, a thin thickness and a light weight etc., the display device may become a new favorite portable device. The display device is especially applicable to the scenarios which require a better display effect under various light rays, and this is unable to be achieved by a transmissive LCD or a reflective LCD.

The existing electronic ink display device may continue to use a manufacturing machine for the active matrix liquid crystal display (AMLCD) and have a simpler manufacturing process. Simply, an indium tin oxide (ITO) plastic substrate is coated with the electronic ink, and then attached to a TFT substrate through a laminator process. This process is the same as the polarizer film attaching process during the manufacturing process of the LCD, and may use an existing machine or the like to perform manufacturing. The simplification of the manufacturing process means an improved rate of finished products and an improved throughput, and furthermore a reduction in the thickness of a substrate reduces the cost.

The existing electronic paper typically adopts technologies such as the cholesterin liquid crystal display, the electrophoretic display (EPD) and the electrowetting display, among which the electrophoretic display is the most promising technology in this field. The electronic ink is mostly used in the electrophoretic display, and is unable to perform colorful display but only black and white display.

FIG. 1 shows a bi-stability reflective display, which adopts the electrophoresis (EP) phenomenon to achieve the display and contrast effect. Charged particles move to an electrode having an opposite polarity under the action of an electric filed, which is called EP. When the EP in an EP display occurs, an EP speed mainly depends on factors such as a viscosity of the EP liquid, a charge quantity of a particle (permanently charged or inductively charged), a dielectric property of an electrolyte, a magnitude of an applied electric field and a distance between electrodes. The EP speed may have an effect on a responding speed.

The film layer structure of the existing EPD as shown in FIG. 2 from top to bottom includes: a protective film 5, an organic plastic 6, an ITO 7, a bonding glue layer 8, an adhesion layer 9, and a pixel electrode (not shown). Microcapsules 1 are provided (between two layers of electrodes) in the bonding glue layer 8. The microcapsules 1 may include positively charged white particles 2 which are generally $TiO_2$ particles, negatively charged black particles 3, and a transparent EP liquid 4. The distribution of the white particles and black particles on the electrodes may be controlled by controlling the direction of the electric field. For example, when a black picture is displayed, a positive voltage is applied on an upper electrode and a negative voltage is applied on a lower electrode. Under the action of the electric field, the positively charged white particles move downward and close to the lower electrode, and the negatively charged black particles move upward and close to the upper electrode. Therefore, a black picture may be observed from the top.

An electronic display device applicable to colorful display is also disclosed in the prior art, in order to alleviate the problem of the single-color (monochromic) display.

For example, Chinese patent application publication No. 103576404A discloses an electronic ink paper capable of displaying a black/white pattern and a colorful pattern. This electronic ink paper may include an electronic ink paper having its upper-layer transparent, a transparent layer, a transparent pixel electrode, microcapsules having their upper-layers transparent, a first positively charged colorful dye, a first negatively charged colorful dye, transparent liquid, a vertically transparent electrode, an electronic ink paper having its lower-layer transparent, a colorful substrate, microcapsules having their lower-layers transparent, a second positively charged colorful dye, and a second negatively charged colorful dye. The electronic ink paper may generate a black/white pattern and a colorful pattern. Although the above-mentioned technical solution may display a colorful pattern, the dying on the charged particles by using the dye is unstable, and has the disadvantages of the colorful development being not enough even and the color being not fresh. Therefore, it is desirable to provide an improved colorful electronic display device.

SUMMARY

An object of the present disclosure is to provide an electronic paper display device, which achieves colorful display by adding quantum dots into microcapsules in an electronic ink layer.

For this purpose, the disclosure adopts the following technical solutions.

An electronic paper display device, including an upper substrate provided with a first electrode layer, a lower substrate provided with a second electrode layer and an electronic ink layer disposed between the first electrode layer and the second electrode layer. Microcapsules are distributed in the electronic ink layer, and at least one kind of quantum dots which are used to display one color are encapsulated within the microcapsules.

At least one kind of quantum dots which are for displaying red, green and blue, may be encapsulated within the microcapsules.

The colorful display of the electronic paper is achieved by using the light emitting characteristic of quantum dots according to the disclosure. A nano-particle (i.e., nano-crystal) is referred to as a quantum dot (QD), which has a semiconductor structure with a size of nanometers. Different from a one-dimension quantum line, the QD has a zero-dimension structure. The QD has a grain size in a range from 2 nm to 20 nm, and the color of the QD may converted into various colors such as red, green and blue according to the size of the QD.

The quantum dots for displaying red, green and blue may respectively have a grain size ranging from 18 nm to 20 nm, a grain size ranging from 12 nm to 14 nm and a grain size ranging from 6 nm to 8 nm.

According to the electronic paper display device of the disclosure, two kinds of charged particles may be provided within the microcapsules, one kind of the charged particles having a polarity opposite to the other kind of the charged particles, and surfaces of one or two kinds of charged particles are clad with the quantum dots.

The charged particles may have a grain size which is 10 to 100 times as much as a grain size of the quantum dots.

According to the electronic paper display device of the disclosure, the charged particles within the microcapsules may include positively charged white particles and negatively charged black particles, and each of the positively charged white particles is clad with a quantum dot layer, wherein the quantum dots in the quantum dot layer are neutral.

Alternatively, the charged particles within the microcapsules may include negatively charged black particles and positively charged white particles, and each of the negatively charged black particles is clad with a quantum dot layer, wherein the quantum dots in the quantum dot layer are neutral.

Alternatively, charged particles within the microcapsules may include negatively charged black particles each of which is clad with a quantum dot layer, and positively charged white particles each of which is clad with the quantum dot layer, wherein the quantum dots in the quantum dot layer are neutral.

In additional, according to the multiple-color electronic display device of the disclosure, two kinds of charged particles may be provided within the microcapsules, one kind of the charged particles having a polarity opposite to the other kind of the charged particles, and charged quantum dots are directly taken as one or two kinds of the charged particles to achieve a colorful display of a pure color.

According to the above solution, the charged quantum dots are taken as one or two kinds of the charged particles to achieve a colorful display of a pure color. As mentioned above, the charged particles within the microcapsules may include two kinds of charged particles, one kind of the charged particles have a polarity opposite to the other kind of the charged particles.

According to the solution, the charged particles within the microcapsules may include positively charged quantum dots and negatively charged black particles; or include positively charged white particles and negatively charged quantum dots.

By means of the above solutions, a dual-color display with a wide color range of an electronic paper product may be achieved according to the disclosure. Furthermore, a more pure and clearer color display may be achieved, so as to achieve an improved applicability and generalizability.

Figure 1:
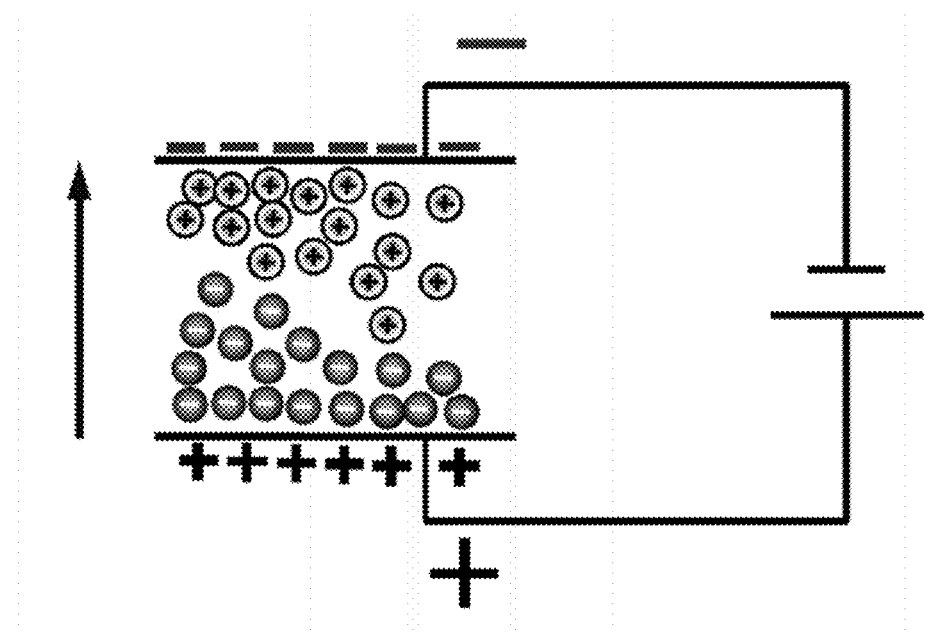
FIG. 1 is a schematic diagram of the electrophoresis principle of the EPD, where the color development is performed by the electrophoresis flow.

In the appended drawings, 1 denotes microcapsules; 2 denotes positively charged white particles; 3 denotes negatively charged black particles; 4 denotes transparent electrophoresis liquid; 5 denotes a protective film; 6 denotes an organic plastic; 7 denotes an ITO; 8 denotes a bonding glue layer; 9 denotes an adhesive layer; 11 denotes red quantum dots; 12 denotes green quantum dots; and 13 denotes blue quantum dots.

DETAILED DESCRIPTION

The disclosure provides an electronic paper display device, including an upper substrate provided with a first electrode layer, a lower substrate provided with a second electrode layer, and an electronic ink layer disposed between the first electrode layer and the second electrode layer. Microcapsules are distributed in the electronic ink layer, and at least one kind of quantum dots are encapsulated within the microcapsule, each kind of quantum dots being used for displaying one color.

Preferably, at least one kind of quantum dots for displaying colors of red, green and blue may be encapsulated within the microcapsules.

The electronic paper display device according to the disclosure may continue to adopt various EPD film layer structures in the prior art. It is predictable that colorful display may be achieved through applying the conventional EPD film layer structure by means of an improved microcapsule according to the disclosure.

The colorful display of the electronic paper is achieved by using the light emitting characteristic of quantum dots according to the disclosure. A nano-particle (i.e., nano-crystal) is referred to as a quantum dot (QD), which has a semiconductor structure with a size of nanometers. Different from a one-dimension quantum line, the QD has a zero-dimension structure. The QD has a grain size in a range from 2 nm to 20 nm, and the color of the QD may converted into various colors such as red, green and blue according to the size of the QD.

The light emitting of the quantum dots has the following characteristics.

(1) a wavelength at which a light may be emitted has a range from the visible waveband to the infrared waveband;

(2) a better stability than an organics;

(3) the full width at half maximum (FWHM) of the emitted light is less than 20 nm;

(4) a quantum efficiency may be up to 90%; and (5) a quantum LED may be manufactured by mixed up with an organic transmission layer.

Since the FWHM of the light emitted by the quantum dots is very narrow, the color of the emitted light is more pure and fresh, and has an improved monochromaticity.

The quantum dots which may be used to display red, green and blue according to the disclosure respectively have a grain size ranging from 18 nm to 20 nm, a grain size ranging from 12 nm to 14 nm, a grain size ranging from 6 nm to 8 nm.

The excitation and reflection of the quantum dots on different colors of light may be achieved by controlling the grain size of the quantum dots according to the disclosure. A quantum dot which has a grain size ranging from 18 nm to 20 nm may be excited to emit red light, a quantum dot which has a grain size ranging from 12 nm to 14 nm may be excited to emit green light, and a quantum dot which has a grain size ranging from 6 nm to 8 nm may be excited to emit blue light.

Furthermore, various ways by which quantum dots are added (encapsulated) into the microcapsule are provided according to the disclosure, in order to achieve colorful display.

According to a first solution, two kinds of charged particles may be provided within the microcapsules according to the disclosure, each kind of the charged particles have a polarity opposite to the other kind of the charged particles, and surfaces of one or two kinds of charged particles are clad with the quantum dots.

According to this solution, the surfaces of the conventional charged particles are clad with the quantum dots, and the colorful display of a pure color may be achieved by using that quantum dots with a different grain size are capable of displaying a different color.

The charged particles according to the disclosure have a grain size in a range which is 10 to 100 times as much as the grain size of the quantum dots. Therefore, the quantum dots may evenly clothe the surfaces of the charged particles to stably display a color.

The solution may include but not limited to the following embodiments.

(1) The charged particles within the microcapsules of the disclosure may include the positively charged white particles each of which is clad with a quantum dot layer, and the negatively charged black particles, where the quantum dots in the quantum dot layer are neutral. In this solution, the grain size of the quantum dots may be one of the grain sizes respectively used for displaying red (18 nm to 20 nm), green (12 nm to 14 nm) and blue (6 nm to 8 nm). When the black color is to be displayed, the voltage of the upper electrode is controlled to be greater than the voltage of the lower electrode, and a black picture may be observed from the top. When the white color is to be displayed, the voltage of the upper electrode is controlled to be lower than the voltage of the lower electrode, and at this time the positively charged quantum dots move to the upper electrode. When external light incidents, the light excites the quantum dots to emit red, green or blue light.

In the case that all the quantum dots in the quantum dot layer have a grain size ranging from 18 nm to 20 nm, the solution may achieve a dual-color display of red and black. Furthermore, a dual-color display of black and any one of red, green, and blue may be achieved by selecting the grain size of the quantum dots.

(2) The charged particles within the microcapsules of the disclosure may include the negatively charged black particles each of which is clad with a quantum dot layer, and the positively charged white particles, where the quantum dots in the quantum dot layer are neutral. The displaying method of the embodiment is the same as (1).

According to this embodiment, a dual-color display of white and any one of red, green and blue may be achieved by selecting the grain size of the quantum dots.

(3) The charged particles within the microcapsules of the disclosure may include the negatively charged black particles each of which is clad with a quantum dot layer and the positively charged white particles each of which is clad with the quantum dot layer, where the quantum dots in the quantum dot layer are neutral. The displaying method of the embodiment is the same as (1).

According to this embodiment, a dual-color display of any two of red, green and blue may be achieved by selecting the grain size of the quantum dots.

In addition to the above solution, a second solution is further provided according to the disclosure.

That is, in the microcapsules, the charged quantum dots are directly used as one or two kinds of charged particles to achieve colorful display.

Preferably, the charged particles within the microcapsules include two kinds of quantum dots, and one kind of the quantum dots have a polarity opposite to the other kind of the quantum dots.

The second solution may include but not limited to the following embodiments.

The charged particles within the microcapsules may include the positively charged quantum dots and negatively charged black particles. According to this embodiment, the positively charged quantum dot may be one of the quantum dots respectively used for displaying red (18 nm to 20 nm), green (12 nm to 14 nm) and blue (6 nm to 8 nm), or may be a mixture of the three kinds of quantum dots to display white.

When the black color is to be displayed, the voltage of the upper electrode is controlled to be greater than the voltage of the lower electrode, and then a black picture may be observed from the top. When the white color is to be displayed, the voltage of the upper electrode is controlled to be smaller than the voltage of the lower electrode, and at this time the positively charged particles move upward to the upper electrode. When external light incidents, the light excites the quantum dots to emit three colors of lights which are then mixed into a white light. The displaying of red, green or blue may be achieved merely by controlling the grain sizes of the positively charged quantum dots.

In addition, the second solution may include another embodiment. According to this embodiment, the charged particles within the microcapsules of the disclosure may include positively charged white particles and negatively charged quantum dots. In this embodiment, the negatively charged quantum dots may be one of the quantum dots respectively used for displaying red (18 nm to 20 nm), green (12 nm to 14 nm) and blue (6 nm to 8 nm), such that a dual-color display of black and one of red, green and blue may be achieved. The displaying method is the same as the above.

The quantum dots are charged by means of a conventional technical means in the second solution.

The black particles of the disclosure may include but not limited to carbon-black particles, and the white particles may include but not limited to titanium oxide particles.

The manufacturing method of the quantum dot layer may be a prior-art method, which may include but not limited to the following: charged particles are put into a dispersion in which quantum dots are dissolved, and at the same time, the quantum dots may be naturally attached to the charged particles by means of ultrasonic sound; the extent of attachment of the quantum dots to the surfaces of the charged particles is controlled by the concentration and time of quantum dot liquid, in order that the charged particles (e.g., black particles and white particles) are evenly clad with the quantum dots. The implementation for the above has been known by the skilled in the art and the description thereof will be omitted herein.

The quantum dots according to the disclosure have various advantages. For example, the quantum dots may be subject to multiple times of excitation and light emitting, and thus the durable stability guarantees its application effect. Furthermore, the most important advantage of the quantum dots is that the quantum dots have plenty of colors. The quantum dots of the disclosure may perform dual-color display of a wide range in an electronic paper product, and has a more pure and clearer color, achieving a higher practicability and generalizability.

First Embodiment

Figure 2:
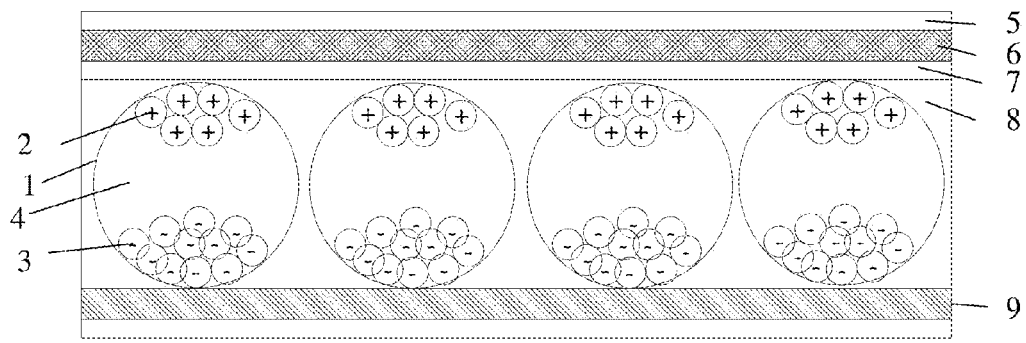
FIG. 2 is schematic diagram of a film layer structure of the existing EPD.

The film layer structure of an EPD as shown in FIG. 2 from top to bottom includes: a protective film 5, an organic plastic 6, an ITO 7, a bonding glue layer 8, an adhesion layer 9 and a pixel electrode (not shown). Microcapsules 1 are provided between (two layers of electrodes) in the bonding glue layer 8.

Figure 4:
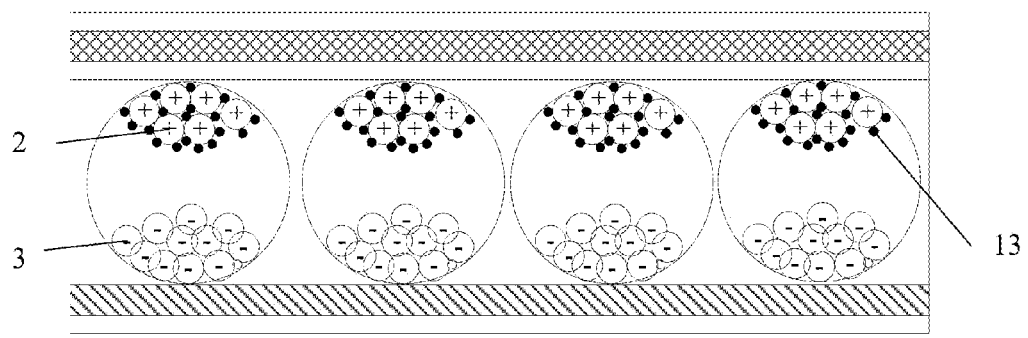
FIG. 4 is one of schematic diagrams of an electronic ink layer of colorful display according to the disclosure, where neutral blue quantum dots and positively charged white particles clad with the neutral blue quantum dots collectively form positively charged particles.

As shown in FIG. 4, according to this embodiment, positively charged white particles 2 and negatively charged black particles 3 are contained in the microcapsules 1, where the positively charged white particle 2 is clad with a quantum dot layer consisted of blue quantum dots 13.

When the black color is to be displayed, a voltage of an upper electrode is controlled to be greater than a voltage of a lower electrode, and thus a black picture can be observed from the top. When a blue pattern is to be displayed, the voltage of the upper electrode is controlled to be smaller than the voltage of the lower electrode, and at this time the positively charged white particles 2 moves upward to the upper electrode. When external light incidents, the light excites the quantum dots to emit blue light, achieving the display of blue color.

According to this embodiment, in the case that all the quantum dots in the quantum dot layer have a grain size ranging from 18 nm to 20 nm, the solution may achieve a dual-color display of red and black. Furthermore, in a case that all the quantum dots in the quantum dot layer have a grain size ranging from 6 nm to 8 nm, the solution may achieve another dual-color display (blue and black). That is, a dual-color display of black and one of red, green and blue may be achieved by selecting the grain size of the quantum dots according to this embodiment.

Second Embodiment

This embodiment is different from the first embodiment only in the following.

Figure 5:
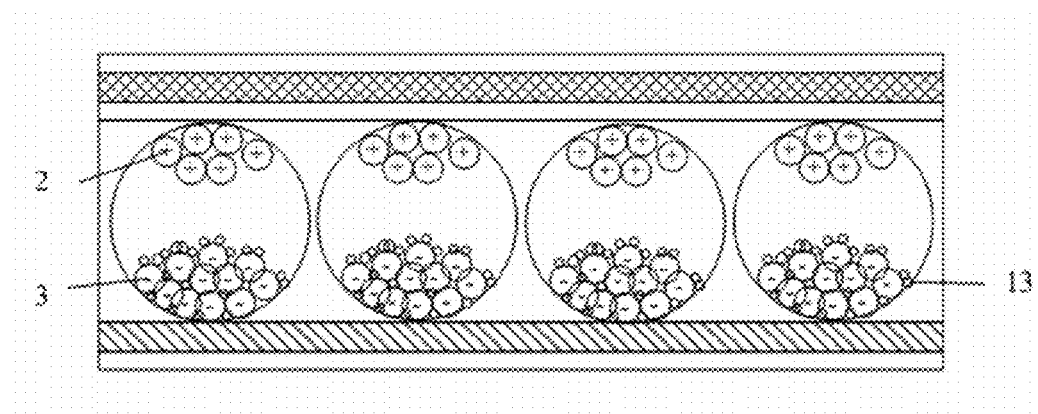
FIG. 5 is one of the schematic diagrams of the electronic ink layer of colorful display according to the disclosure, where neutral blue quantum dots and a negatively charged black particles clad with the neutral blue quantum dots collectively form negatively charged particles.

As shown in FIG. 5, positively charged white particles 2 and negatively charged black particles 3 are contained in the microcapsules 1, where the negatively charged black particles 3 are clad with a quantum dot layer consisted of blue quantum dots 13.

When the blue color is to be displayed, the voltage of the upper electrode is controlled to be greater than the voltage of the lower electrode, and incident external light excites the quantum dots to emit a blue light, achieving a blue display. When a white pattern is to be displayed, the voltage of the upper electrode is smaller than the lower electrode, and at this time the positively charged white particles 2 move upward to the upper electrode, achieving a white display.

According to this embodiment, in a case that all the quantum dots in the quantum dot layer have a grain size ranging from 18 nm to 20 nm, a dual-color display of red and black may be achieved according to this solution. In the case that all the quantum dots in the quantum dot layer have a grain size ranging from 12 nm to 14 nm, a dual-color display of green and black may be achieved according to this solution. That is, a dual-color display of white and any one of red, green and blue may be achieved by selecting the grain size of the quantum dots.

Third Embodiment

The third embodiment is different from the first embodiment only in the following.

Figure 6:
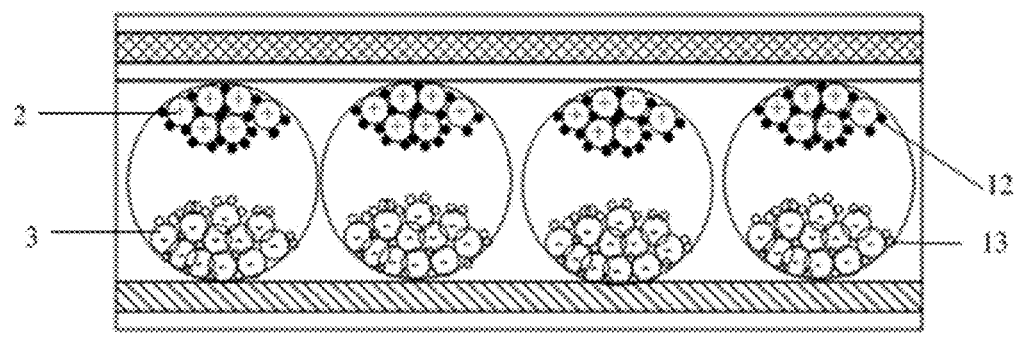
FIG. 6 is one of the schematic diagrams of the electronic ink layer of colorful display according to the disclosure, where positively charged white particles and negatively charged black particles are respectively clad with neutral green quantum dots and the neutral blue quantum dots, so as to form positively charged particles and negatively charged particles respectively.

As shown in FIG. 6, according to this embodiment, the positively charged white particles 2 and negatively charged black particles 3 are contained within the microcapsules 1, where the negatively charged black particles 3 are clad with a quantum dot layer consisted of blue quantum dots 13, and the positively charged white particles 2 are clad with a quantum dot layer consisted of green quantum dots 12.

When the blue color is to be displayed, the voltage of the upper electrode is controlled to be greater than the voltage of the lower electrode, and incident external light excites the quantum dots to emit blue light, achieving a blue display. When a white pattern is to be displayed, the voltage of the upper electrode is controlled to be smaller than the voltage of the lower electrode, and at this time the positively charged white particles 2 move upward to the upper electrode, achieving a green display.

A dual-color display of any two of red, green and blue may be achieved by selecting the grain size of the quantum dots according to this embodiment.

Fourth Embodiment

The fourth embodiment is different from the first embodiment only in the following.

Figure 3:
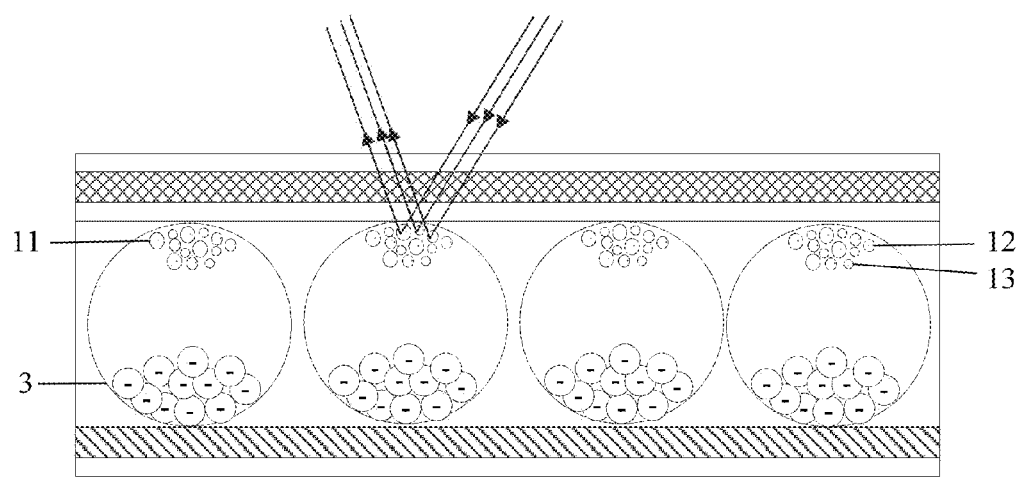
FIG. 3 is a schematic diagram of an electronic ink layer of black/white display according to the disclosure, where positively charged quantum dots of three colors are taken as positively charged particles, and a black/white dual-color display may be achieved.

As shown in FIG. 3, according to this embodiment, the positively charged quantum dots and the negatively charged black particles 3 are contained within the microcapsules 1, where the positively charged quantum dots are a mixture of the red quantum dots 11, the green quantum dots 12 and the blue quantum dots 13.

When the black color is to be displayed, the voltage of the upper electrode is controlled to be greater than the voltage of the lower electrode, and thus a black picture can be observed from the top. When a white pattern is to be displayed, the voltage of the upper electrode is controlled to be smaller than the voltage of the lower electrode, and at this time the positively charged quantum dots move upward to the upper electrode. Incident external light excites the quantum dots to emit a red light, a green light and a blue light which are then mixed into a white light.

Fifth Embodiment

The fifth embodiment is different from the first embodiment only in that, all the charged particles are merely the positively charged red quantum dots 11 and the negatively charged blue quantum dots 13 (replacing conventional charged particles with the quantum dots themselves), by which a dual-color display of red and blue may be achieved. Furthermore, a dual-color display of any two of red, green and blue may be achieved by selecting the grain size of the quantum dots.

The above-mentioned embodiments are intended to illustrate and not limit the disclosure. Various modifications and variations may be made by the skilled in the art, without departing from the spirit and scope of the disclosure. Therefore, all the equivalent technical solutions will fall within the scope of the disclosure, and the protection scope of the disclosure will be defined by the appended claims.

What is claimed is:

1. An electronic paper display device, comprising:
an upper substrate provided with a first electrode layer;
a lower substrate provided with a second electrode layer; and
an electronic ink layer provided between the first electrode layer and the second electrode layer, microcapsules being distributed within the electronic ink layer,
wherein at least one kind of quantum dots for displaying one color are encapsulated within the microcapsules;
wherein two kinds of charged particles are provided within the microcapsules, one kind of the charged particles having a polarity opposite to the other kind of the charged particles; and
wherein one kind or two kinds of the charged particles are respectively clad with the quantum dots.

2. The electronic paper display device according to claim 1, wherein the quantum dots for displaying at least one of red, green and blue are encapsulated within the microcapsules.

3. The electronic paper display device according to claim 2, wherein the quantum dots for displaying red have a grain size ranging from 18 nm to 20 nm.

4. The electronic paper display device according to claim 2, wherein the quantum dots for displaying green have a grain size ranging from 12 nm to 14 nm.

5. The electronic paper display device according to claim 2, wherein the quantum dots for displaying blue have a grain size ranging from 6 nm to 8 nm.

6. The electronic paper display device according to claim 1, wherein the charged particles have a grain size which is 10 to 100 times as much as a grain size of the quantum dots.

7. The electronic paper display device according to claim 1, wherein the charged particles within the microcapsules comprise negatively charged black particles and positively charged white particles, each of the positively charged white particles being clad with a quantum dot layer, wherein the quantum dots in the quantum dot layer are neutral.

8. The electronic paper display device according to claim 1, wherein the charged particles within the microcapsules comprise positively charged white particles and negatively charged black particles, each of the negatively charged black particles being clad with a quantum dot layer, wherein the quantum dots in the quantum dot layer are neutral.

9. The electronic paper display device according to claim 1, wherein the charged particles within the microcapsules comprise negatively charged black particles each of which is clad with a quantum dot layer, and positively charged white particles each of which is clad with the quantum dot layer; and wherein the quantum dots in the quantum dot layer are neutral.

10. The electronic paper display device according to claim 1, wherein one kind of the charged particles having a polarity opposite to the other kind of the charged particles; and wherein charged quantum dots are directly taken as one kind of the charged particles to achieve colorful display of a pure color.

11. The electronic paper display device according to claim 10, wherein the charged particles within the microcapsules comprise positively charged quantum dots and negatively charged black particles.

12. The electronic paper display device according to claim 10, wherein the charged particles within the microcapsules comprise positively charged white particles and negatively charged quantum dots.

13. The electronic paper display device according to claim 1, wherein one kind of the charged particles having a polarity opposite to the other kind of the charged particles; and wherein charged quantum dots are directly taken as two kinds of the charged particles to achieve colorful display of a pure color.

14. The electronic paper display device according to claim 13, wherein the charged particles within the microcapsules comprise two kinds of quantum dots, one kind of the quantum dots having a polarity opposite to the other kind of the quantum dots.

* * * * *